US011333364B2

(12) United States Patent
Castillo et al.

(10) Patent No.: US 11,333,364 B2
(45) Date of Patent: May 17, 2022

(54) ADAPTIVE COOKING SYSTEM

(71) Applicant: Rockwell Collins, Inc., Cedar Rapids, IA (US)

(72) Inventors: Arnau Castillo, Maarssen (NL); Michiel Blaauwhof, Voorschoten (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 15/946,398

(22) Filed: Apr. 5, 2018

(65) Prior Publication Data
US 2019/0309955 A1 Oct. 10, 2019

(51) Int. Cl.
*F24C 7/08* (2006.01)
*F24C 15/00* (2006.01)
*F24C 15/32* (2006.01)
*A23L 5/10* (2016.01)

(52) U.S. Cl.
CPC ............... *F24C 7/081* (2013.01); *A23L 5/13* (2016.08); *A23L 5/15* (2016.08); *F24C 15/003* (2013.01); *F24C 15/327* (2013.01); *F24C 15/322* (2013.01)

(58) Field of Classification Search
CPC ...... F24C 7/081; F24C 15/003; F24C 15/327; F24C 15/322; A21B 3/04; A23L 1/0128; A23L 3/01; A23L 3/365; A23L 5/13; A23L 5/15; H05B 6/6447; H05B 6/687; H05B 6/6455; G01G 19/12; G01G 19/415;
(Continued)

(56) References Cited

U.S. PATENT DOCUMENTS

| | | | | |
|---|---|---|---|---|
| 4,476,946 A | * | 10/1984 | Smith | ................. G01G 3/1402 177/144 |
| 5,293,019 A | * | 3/1994 | Lee | ........................... A23L 3/01 219/708 |
| 5,360,965 A | * | 11/1994 | Ishii | ......................... H05B 6/64 219/705 |
| 5,826,496 A | | 10/1998 | Jara | |
| 10,215,744 B2 | * | 2/2019 | Minvielle | .............. G01N 33/02 |

(Continued)

FOREIGN PATENT DOCUMENTS

CN 103429130 A 12/2013
CN 106859385 A 6/2017
(Continued)

OTHER PUBLICATIONS

Extended Search Report dated Jul. 29, 2019 for EP Patent Application No. 19167204.7.

*Primary Examiner* — Thien S Tran
(74) *Attorney, Agent, or Firm* — Suiter Swantz pc llo

(57) ABSTRACT

An adaptive cooking system includes an oven with at least one heating element configured to heat the oven, at least one steam generator configured to produce steam within the oven, and at least one fan configured to circulate air within the oven. The adaptive cooking system further includes at least one thermometer configured to detect a temperature of air circulating within the oven. A controller is communicatively coupled to the oven components. The controller is configured to cause the fan to circulate air within the oven for a predetermined amount of time. For example, the fan may initially circulate air within the oven while the heating element and the steam generator are turned off or powered down. The controller is further configured to detect a temperature of the air and control the heating element and the steam generator based on the temperature of the air.

20 Claims, 9 Drawing Sheets

(58) Field of Classification Search
CPC .... G01G 19/414; G01G 19/021; G01G 19/00; G01G 21/22
USPC ................................ 219/401, 625, 704–705
See application file for complete search history.

(56) References Cited

U.S. PATENT DOCUMENTS

| | | | | |
|---|---|---|---|---|
| 2007/0029311 | A1* | 2/2007 | Akashi | A23L 3/01 219/625 |
| 2008/0236404 | A1* | 10/2008 | Ose | F24C 7/08 99/327 |
| 2012/0295002 | A1* | 11/2012 | Seitz | A23L 5/13 99/330 |
| 2014/0083309 | A1* | 3/2014 | Reese | A47J 39/003 99/474 |
| 2014/0203012 | A1 | 7/2014 | Corona et al. | |
| 2015/0070492 | A1* | 3/2015 | Hozumi | B64D 47/08 348/143 |
| 2015/0359047 | A1* | 12/2015 | Kishimoto | F24C 7/085 219/704 |
| 2017/0321904 | A1* | 11/2017 | Faraldi | F24C 15/2007 |
| 2018/0299138 | A1* | 10/2018 | Faraldi | F24C 15/327 |
| 2019/0223261 | A1* | 7/2019 | Hofmann | F24C 15/2007 |

FOREIGN PATENT DOCUMENTS

| | | | | |
|---|---|---|---|---|
| CN | 107105936 | B | 3/2020 | |
| EP | 2123981 | A1 | 11/2009 | |
| EP | 3051209 | A1 * | 8/2016 | ............. F24C 7/087 |
| WO | 2011089920 | A1 | 7/2011 | |

\* cited by examiner

ADAPTIVE COOKING SYSTEM

BACKGROUND

Vehicles for mass transport can include, but are not limited to, aircrafts, boats, trains, and busses. The passenger cabins in these types of vehicles are typically designed for long travel durations (e.g., one or more hours of travel). It is also very common for services to be provided during travel. For example, cabin attendants may provide passengers with food and/or beverages.

Sometimes hot meals are provided for passengers. The meals may need to be cooked or reheated during travel, particularly for several hours long travel durations. Steam ovens are often used to cook or reheat the meals in order to preserve moisture in foods and prevent overcooking or temperature inconsistency. However, when frozen meals are cooked or reheated with steam, the steam can condense on an exterior of the foods in a meal and cause the foods to be soggy or undercooked. There is a need for improvements in oven technology to provide consistent results regardless of whether frozen or thawed meals are being cooked or reheated.

SUMMARY

In one aspect, embodiments of the inventive concepts disclosed herein are directed to an adaptive cooking system. The adaptive cooking system includes an oven with at least one heating element configured to heat the oven, at least one steam generator configured to produce steam within the oven, and at least one fan configured to circulate air within the oven. The adaptive cooking system further includes at least one thermometer configured to detect a temperature of air circulating within the oven. A controller is communicatively coupled to the heating element, the steam generator, the fan, and the thermometer. The controller is configured to cause the fan to circulate air within the oven for a predetermined amount of time. For example, the fan may initially circulate air within the oven while the heating element and the steam generator are turned off or powered down. The controller is further configured to detect a temperature of the air with the thermometer after causing the fan to circulate the air within the oven for the predetermined amount of time. The controller is then configured to control the heating element and the steam generator based on the temperature of the air. For example, the controller can be configured to control the heating element and the steam generator based on the temperature of the air by operating the heating element independent of the steam generator for a dry heating cycle when the temperature of the air is below a threshold temperature and then operating the heating element with the steam generator for a steam heating cycle after the dry heating cycle.

In a further aspect, embodiments of the inventive concepts disclosed herein are directed to method of adaptively cooking a plurality of prepackaged meals. The method includes receiving a plurality of prepackaged meals within an oven, such as the oven of the adaptive cooking system described herein. Air is circulated within the oven for a predetermined amount of time so that the air is cooled or heated to an air temperature related to an average temperature of the plurality of prepackaged meals. The temperature of the air is detected after the air has circulated within the oven for the predetermined amount of time. One or more oven heating elements and steam generators are then controlled based on the temperature of the air. In implementations, a heating element can be automatically operated independent of a steam generator for a dry heating cycle when the temperature of the air is below a threshold temperature. The heating element and the steam generator can then be operated together for a steam heating cycle after the dry heating cycle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION

Figure 1:
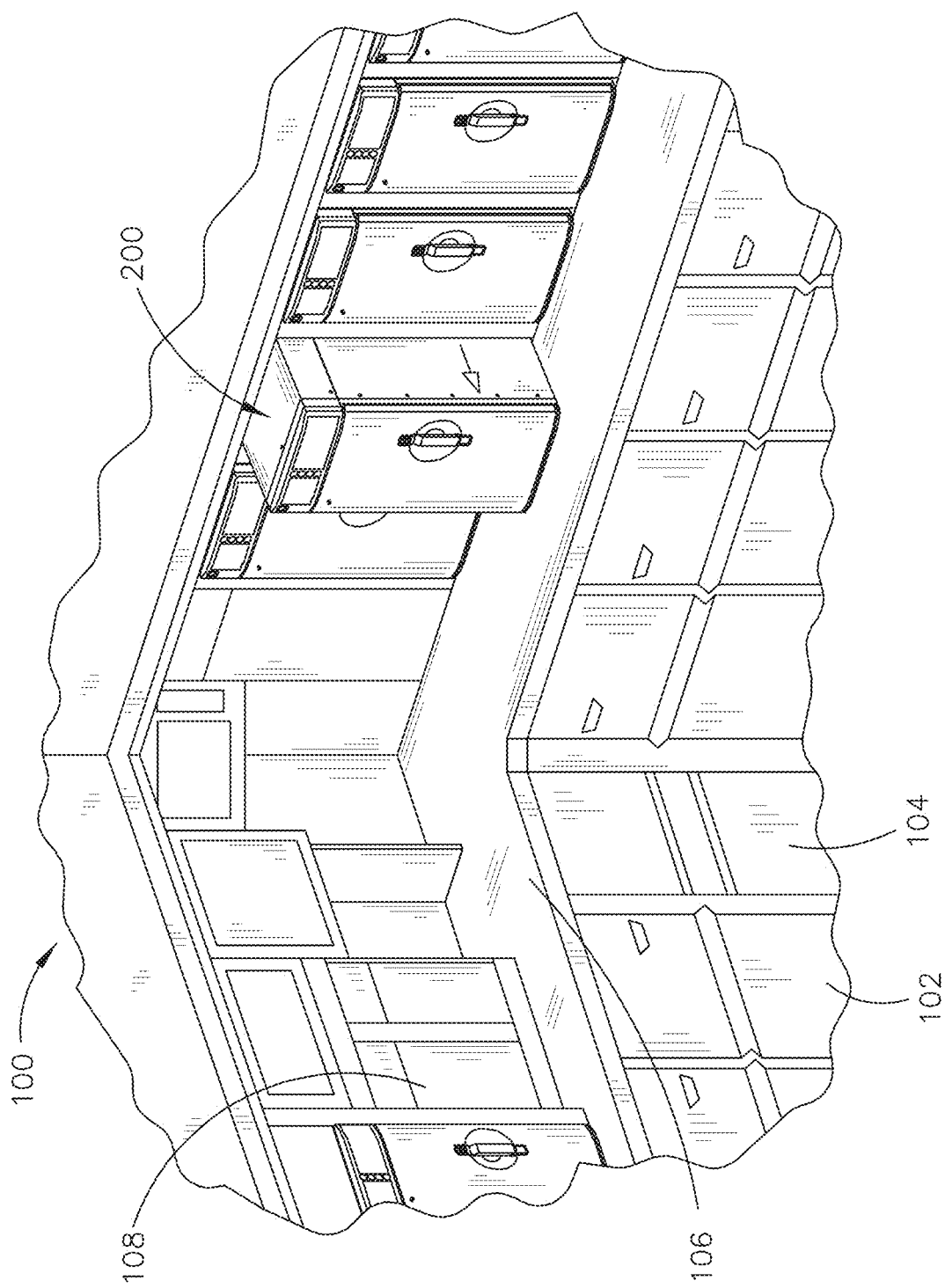
FIG. 1 is an illustration of an aircraft environment including an adaptive cooking system in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an adaptive cooking system. The adaptive cooking system controls dry heating and/or steam heating cycles to improve meal quality. For example, the adaptive cooking system cooks or reheats foods based on an average meal temperature of the meals being cooked or reheated. In implementations, after placing one or more prepackaged meals within an oven, the adaptive cooking system causes a fan to circulate air within the oven for a predetermined amount of time. The fan may initially circulate air within the oven while an oven heating element (or elements) and an oven steam generator (or steam generators) are turned off or powered down so that the temperature of the air correlates to an initial temperature of the meals in the oven. The adaptive cooking system detects a temperature of the air after the air has circulated within the oven for the predetermined amount of time and then controls the heating element and the steam generator based on the temperature of the air. For example, the adaptive cooking system may operate the heating element independent of the steam generator for a dry heating cycle when the temperature of the air is below a threshold temperature and can then operate the heating element with the steam generator for a steam heating cycle after the dry heating cycle ends. In this manner, frozen foods can be thawed using dry heat and then cooked with steam to preserve their moisture content.

FIG. 1 illustrates an example embodiment of an aircraft galley 100 that includes an adaptive cooking system 200. In embodiments, the aircraft galley 100 includes two or more levels of compartments. For example, a first (lower) level of the aircraft galley 100 can include at least one cart 104 that locks into a compartment and one or more storage compartments 102 (e.g., storage lockers, cabinets, drawers, etc.). In some embodiments, a platform 106 is located above the lower level. For example, the platform 106 can be located between the lower level and a second (upper) level. The platform 106 can be used to rest items on (e.g., for food trays, beverage containers, etc.). The upper level may include additional compartments and one or more service devices. For example, the upper level can include at least one coffee maker 108. In the embodiment illustrated in FIG. 1, the upper level of the aircraft galley 100 includes a plurality of adaptive cooking systems 200. This example embodiment is provided for explanatory purposes. In other embodiments, an aircraft galley 100 may include only one adaptive cooking system 200, or one or more adaptive cooking systems 200 can be located at other levels (e.g., on the lower level).

Figure 2:
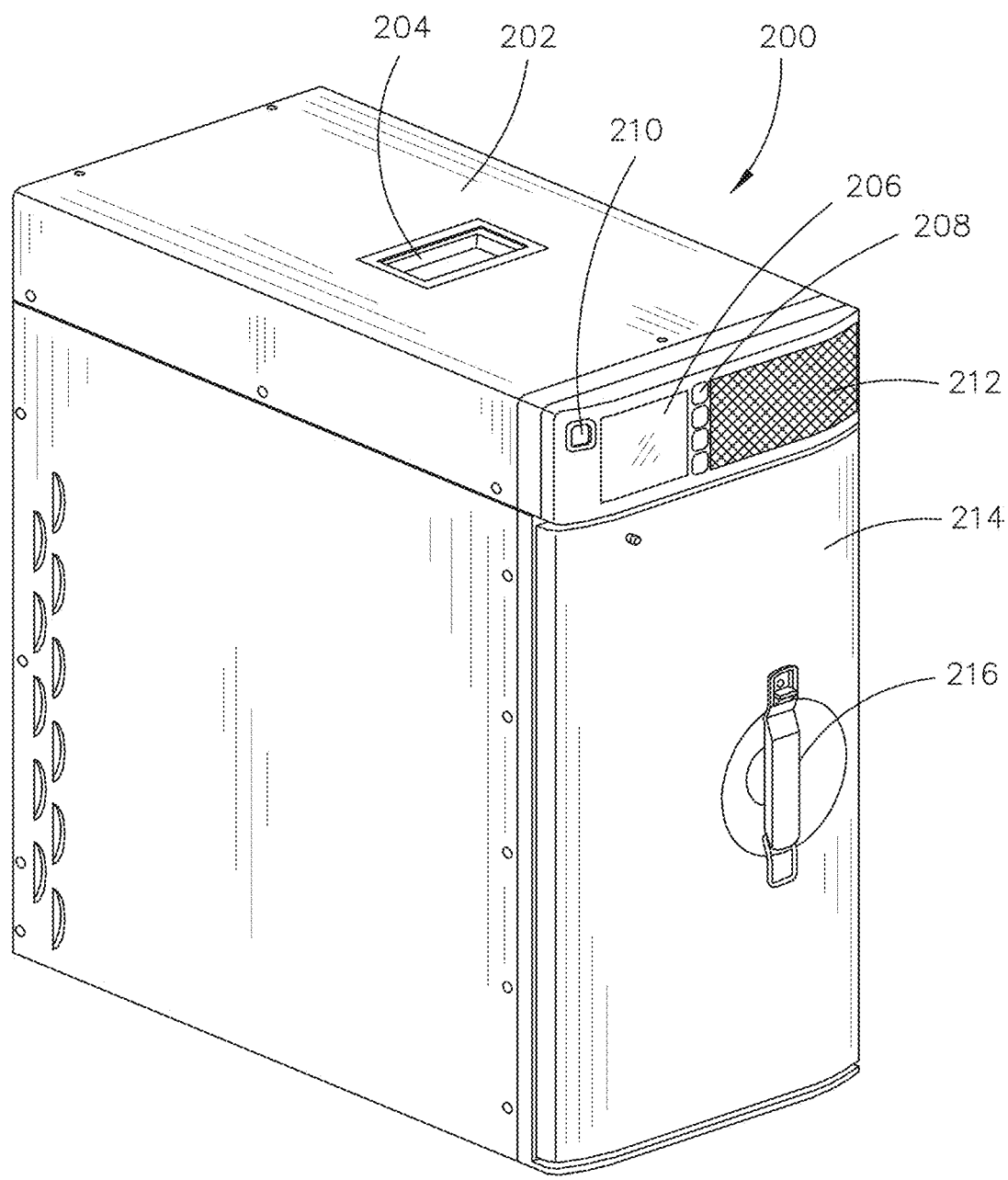
FIG. 2 is a perspective view of an adaptive cooking system in accordance with example embodiments of this disclosure.

Referring generally to FIGS. 2 through 7, the adaptive cooking system 200 includes an oven 202. In some embodiments, the oven 202 is configured to be installed within an aircraft galley 100. For example, as shown in FIG. 2, the oven 202 may include a grip 204 that makes it easier to carry the oven 202 and/or allows the oven 202 to be locked or latched into place for easy installation of the oven 202 within the aircraft galley 100. The oven 202 has an oven door 214 that provides access to a cavity within the oven. The cavity is configured to receive meals to be cooked or reheated within the oven 202. In some embodiments, the oven door 214 includes a latch 216 (e.g., a turn style or sliding latch) that can selectively secure the oven door 214 in a closed position so that the oven door 214 is not inadvertently opened by a user during a cooking cycle and/or to keep the oven door 214 secured during turbulence.

The oven 202 can include one or more user interface devices (e.g., display 206 and/or input devices 208). In embodiments, the display 206 may be an LED display, a liquid crystal display (LCD), or the like. In some embodiments, the display 206 is a touchscreen display. Examples of input devices 208 may include, but are not limited to, a touchscreen display (e.g., display 206), touch pad/panel, one or more buttons, knobs, or switches, a key pad/panel, a microphone (e.g., for voice commands), a camera or motion detector, or any combination thereof. In addition to one or more input devices 208, the oven 202 may include an on/off switch 210. The on/off switch 210 can cause the oven 202 to be completely shut off or powered down when the on/off switch 210 is in an "OFF" position, and the oven 202 can be placed in an operational or standby mode when the on/off switch 210 in an "ON" position.

Figure 3:
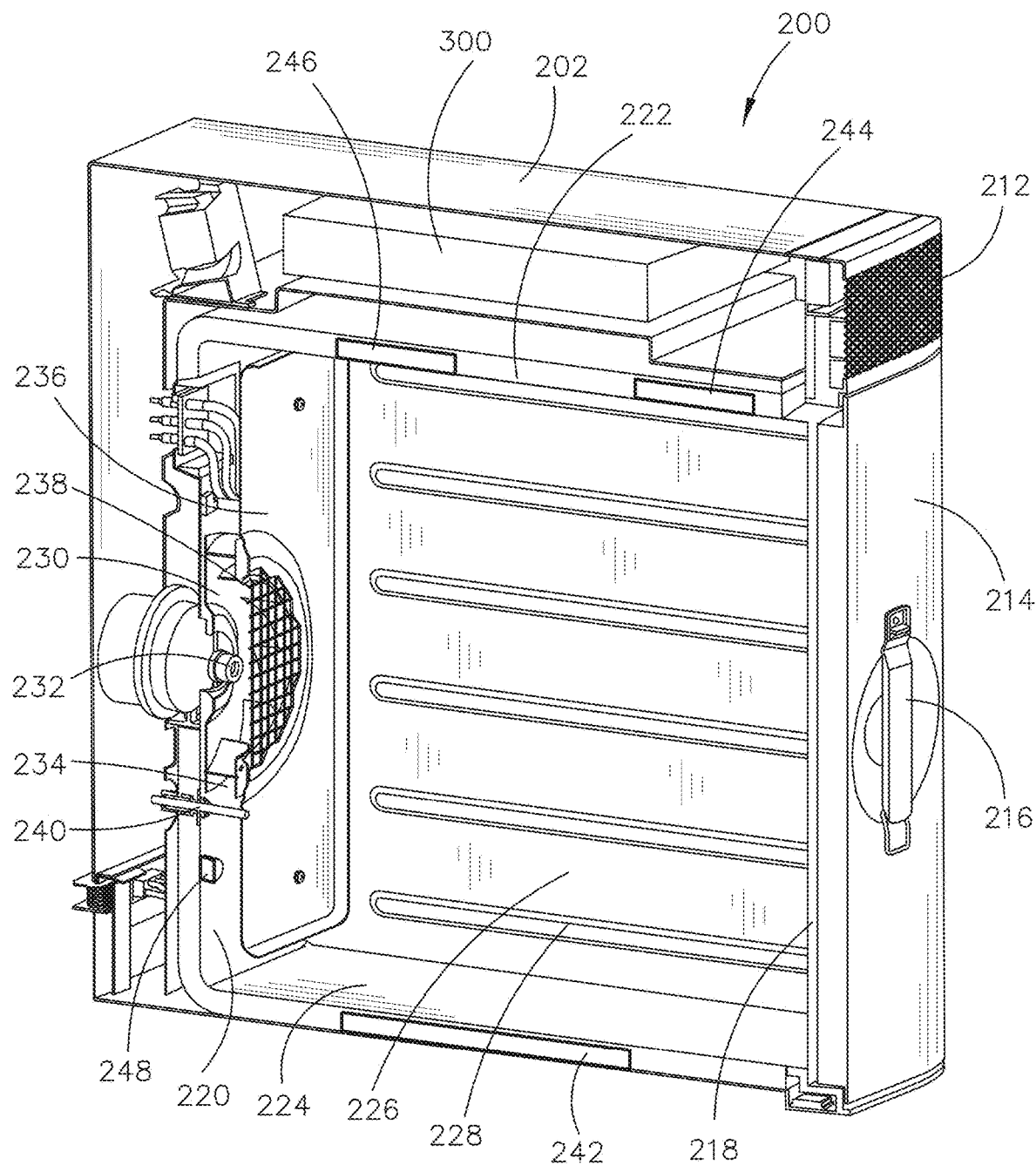
FIG. 3 is a cross-sectional perspective view of an adaptive cooking system in accordance with example embodiments of this disclosure.

In some embodiments, the oven 202 may further include an exhaust vent 212 that releases heat from a controller compartment within the oven 202. For example, as shown in FIG. 3, the exhaust vent 212 can be located near a controller compartment that includes a controller 300 for the oven 202. In some embodiments, the oven 202 further includes a fan or other blower that is configured to direct warm air out of the controller compartment through the exhaust vent 212. For example, the controller 300 may be cooled by blowing warm air from around the controller 300 out of the controller compartment through the exhaust vent 212.

Figure 4:
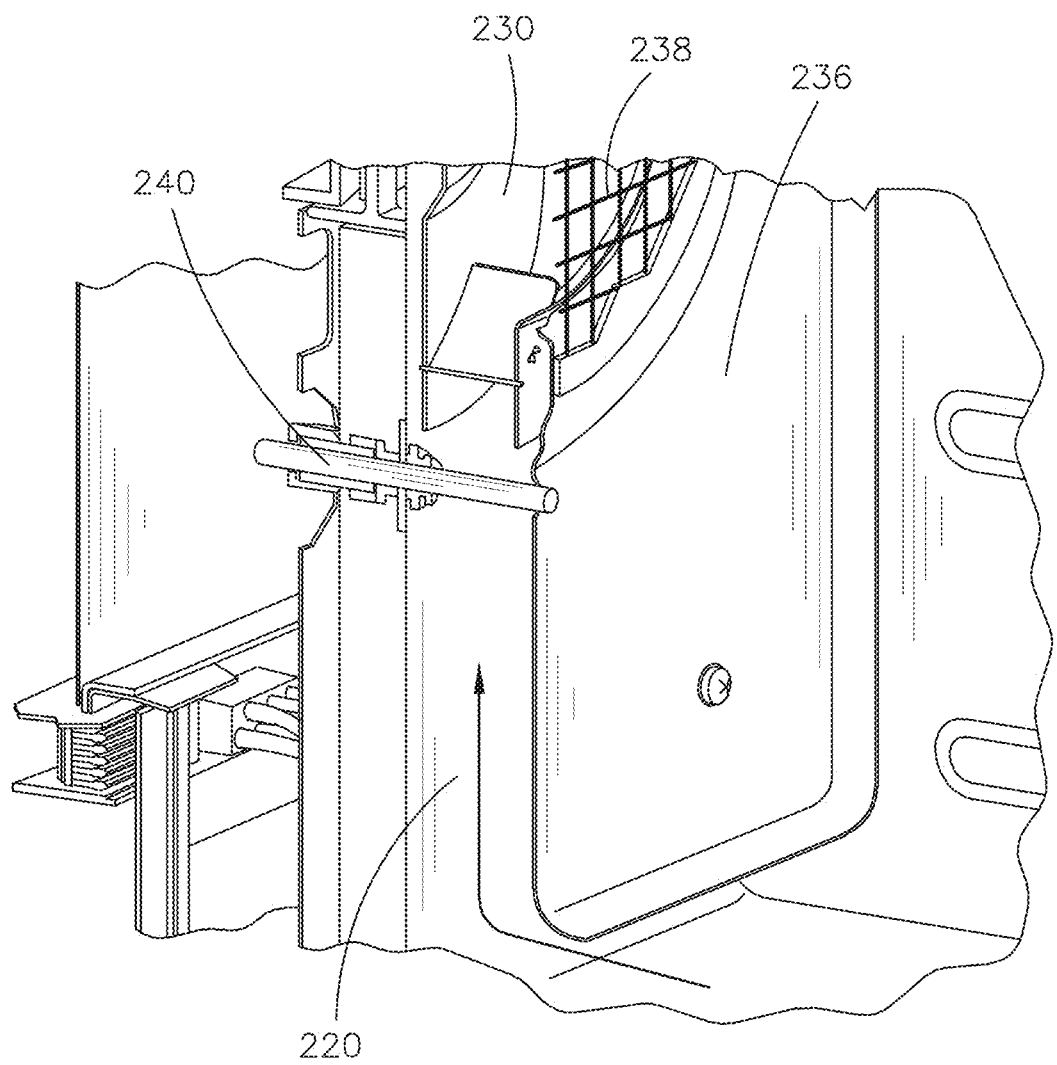
FIG. 4 is a zoomed in portion of a cross-sectional perspective view of an adaptive cooking system in accordance with example embodiments of this disclosure.
Figure 5:
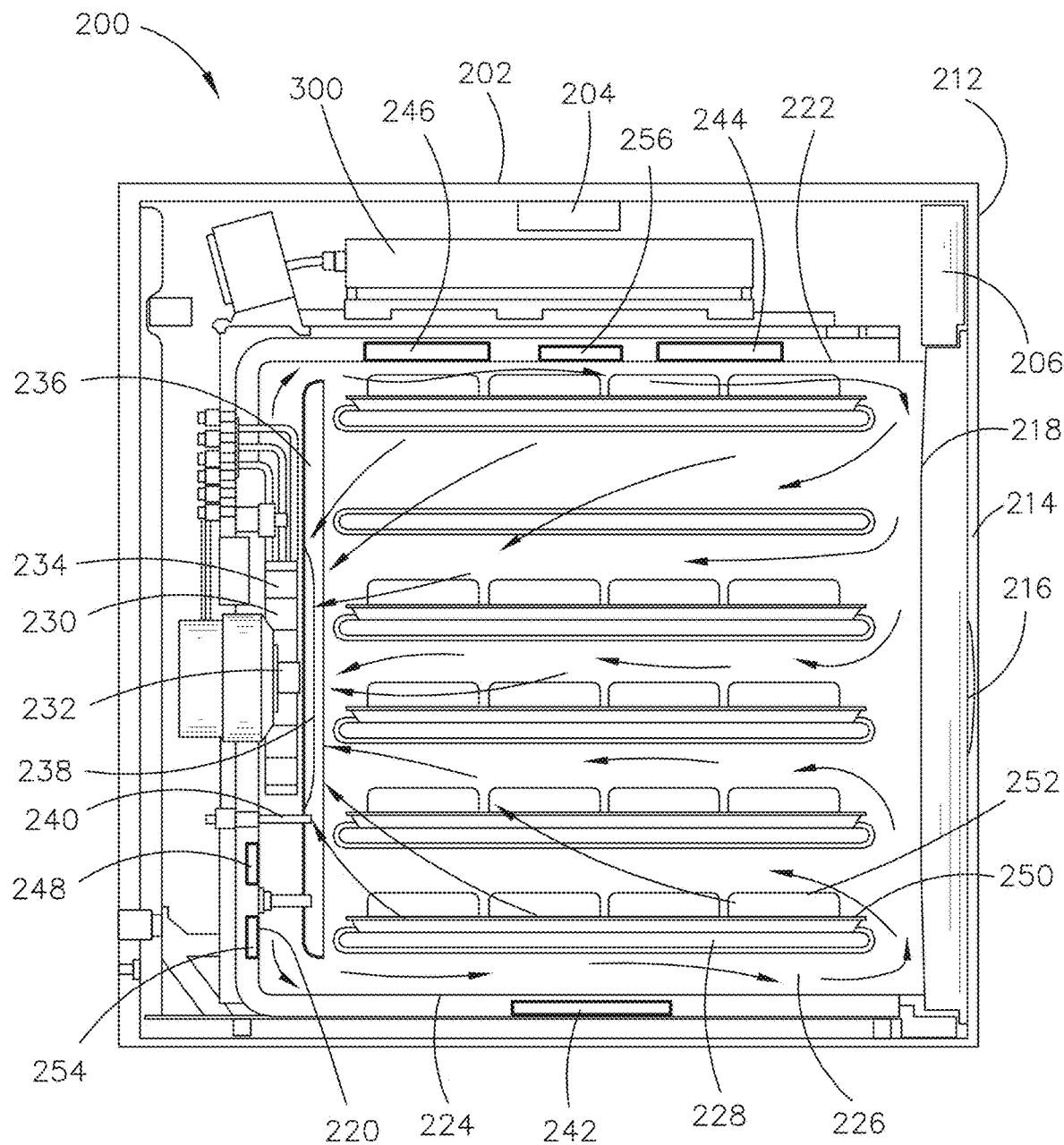
FIG. 5 is a cross-sectional side view of an adaptive cooking system in accordance with example embodiments of this disclosure.

FIGS. 3 through 5 show cross-sectional views of the oven 202 in accordance with an example embodiment of this disclosure. Referring generally to FIGS. 3 through 5, the oven 202 has a cavity defined by an inner front wall 218 (the backside of the oven door 214), an inner back wall 220, inner side walls 226, an inner bottom surface 224, and an inner top surface 222. The cavity is configured to receive items to be cooked or reheated within the oven 202. For example, as shown in FIG. 5, the cavity may be configured to receive a plurality of prepackaged meals 252. In embodiments, the inner side walls 226 can include projections 228 configured to hold support structures 250 (e.g., trays or racks) that carry the prepackaged meals 252.

The adaptive cooking system 200 includes at least one heating element 234 configured to heat the cavity of the oven 202. Examples of a heating element 234 can include, but are not limited to, a conductive rod, coil or grid, an infrared heating element, a magnetron, or a combination thereof. In some embodiments, at least one heating element 234 is positioned at or in proximity to the inner back wall 220 of the oven 202. One or more heating elements 234 may additionally or alternatively be positioned at or in proximity to the inner bottom surface 224, the inner top surface 222, and/or inner side walls 226 of the oven 202.

The adaptive cooking system 200 further includes at least one steam generator 232 configured to produce steam within the cavity of the oven 202. In some embodiments, the steam generator 232 is boiler or cauldron type steam generator that is configured to produce steam that is then fed into the cavity of the oven 202. In other embodiments, the steam generator 232 is an injection type steam generator that is configured to spritz water onto the heating element 234 (or within the core of the rotating ventilator, or onto a heat exchanger) in order to generate steam within the cavity of the oven 202.

The adaptive cooking system 200 also includes at least one fan 230 (or other blower) configured to circulate air within the oven 202. In embodiments, an air circulation barrier 236 with a vent 238 may be positioned in front of the fan 230 to define a flow path for air circulating within the oven 202. The fan 230 can be configured to direct air through the vent 238. The air can then flow around prepackage meals 252 within the cavity and return to the fan 230 after the air is eventually displaced by more air and forced back behind the air circulation barrier 236 (i.e., between the air circulation barrier 236 and the inner back wall 220). When the fan 230 is operated, air can repeat this process time and again to circulate within the oven 202.

One or more sensors can be disposed within the oven 202 and configured to collect data that is used by the controller 300 to implement an adaptive cooking scheme. For example, the oven 202 includes a thermometer 240 disposed within the airflow path of the fan 230. As shown in FIG. 4, the thermometer 240 may be disposed between the air circulation barrier 236 and the inner back wall 220 and in proximity to the fan 230 so that the thermometer 240 can sense a temperature of air circulating within the oven 202. In some embodiments, the oven 202 includes one or more additional sensors. For example, as shown in FIG. 5, the oven 202 may include one or more of: a weight sensor 242 configured to sense a weight of the items (e.g., prepackaged meals) disposed within the cavity; an identity sensor 244 configured to detect an identifier (e.g., scannable label/code (e.g., barcode, QR code, or the like), RFID, etc.) of at least one prepackaged meal disposed within the oven 202; an infrared temperature sensor 246 (e.g., infrared camera or thermometer) configured to detect a temperature of at least one prepackaged meal disposed within the oven 202; an odor sensor 248 configured to detect a change in air quality within the oven 202; a humidity sensor 254 configured to detect humidity/moisture of the air in the oven 202; a pressure sensor 256 configured to detect pressure in the oven 202 cavity; or any combination thereof.

Figure 6:
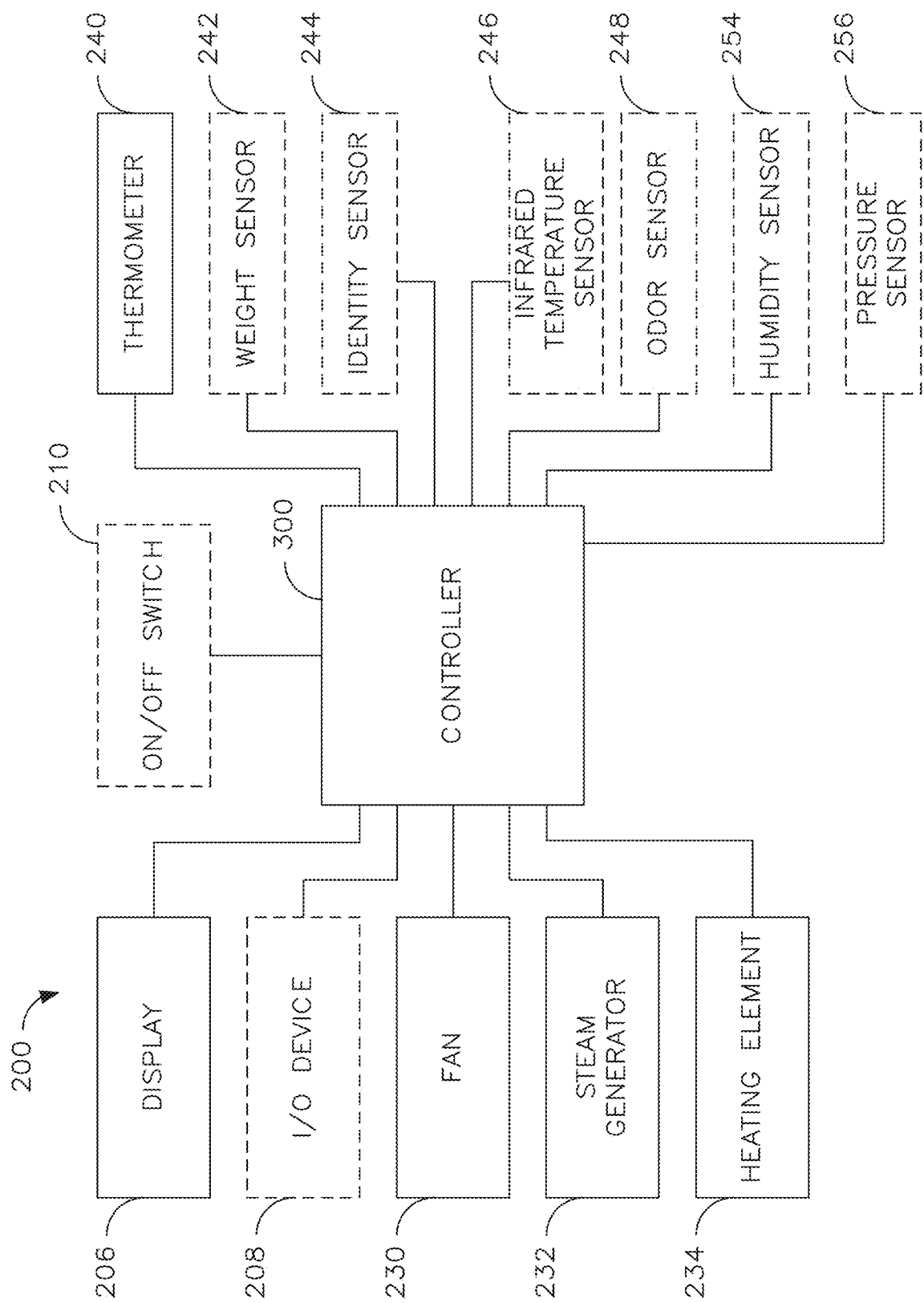
FIG. 6 is block diagram illustrating an adaptive cooking system in accordance with example embodiments of this disclosure.

FIG. 6 is a block diagram illustrating connectivity of the various components of the adaptive cooking system 200 with the controller 300. For example, the controller 300 can be configured to present information via the display 206. The controller 300 can be configured to receive data via at least one input device 208 and/or sensor (e.g., thermometer 240, weight sensor 242, identity sensor 244, infrared temperature sensor 246, odor sensor 248, humidity sensor 254, pressure sensor 256, etc.). The controller 300 can be further configured to control oven components (e.g., the fan 230, the steam generator 232, and the heating element 234) based on user inputs and/or sensor data.

Figure 7:
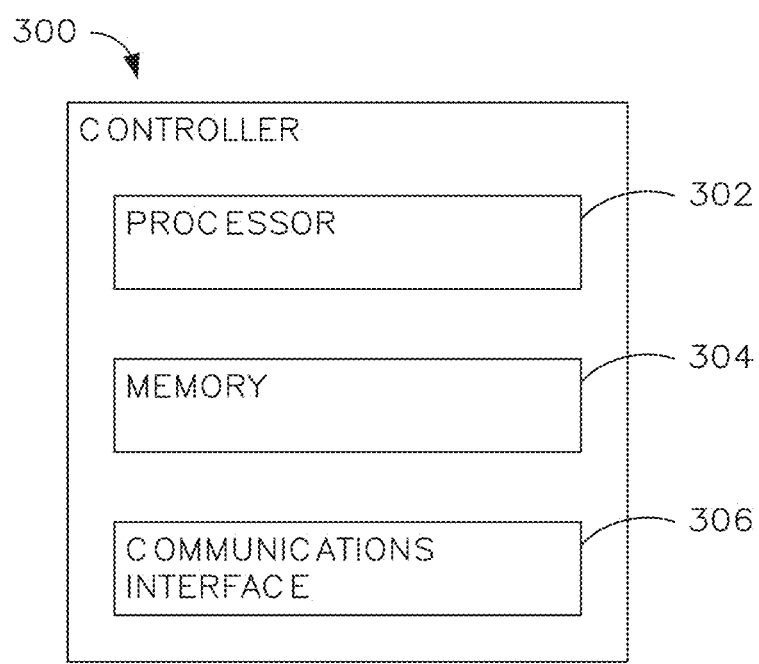
FIG. 7 is a block diagram illustrating a controller for an adaptive cooking system in accordance with example embodiments of this disclosure.

As shown in FIG. 7, in embodiments, the controller 300 includes a processor 302, a memory 304, and a communication interface 306. The controller 300 can be configured (e.g., programmed) to implement the adaptive cooking schemes described herein. The controller 300 components and configurations (e.g., programming) are further described herein.

The processor 302 provides processing functionality for at least the controller 300 and can include any number of processors, micro-controllers, circuitry, field programmable gate array (FPGA) or other processing systems, and resident or external memory for storing data, executable code, and other information accessed or generated by the controller 300. The processor 302 can execute one or more software programs embodied in a non-transitory computer readable medium (e.g., memory 304) that implement techniques described herein. The processor 302 is not limited by the materials from which it is formed or the processing mechanisms employed therein and, as such, can be implemented via semiconductor(s) and/or transistors (e.g., using electronic integrated circuit (IC) components), and so forth.

The memory 304 can be an example of tangible, computer-readable storage medium that provides storage functionality to store various data and or program code associated with operation of the controller 300, such as software programs and/or code segments, or other data to instruct the processor 302, and possibly other components of the adaptive cooking system 200/controller 300, to perform the functionality described herein. Thus, the memory 304 can store data, such as a program of instructions for operating the adaptive cooking system 200 (including its components), and so forth. It should be noted that while a single memory 304 is described, a wide variety of types and combinations of memory (e.g., tangible, non-transitory memory) can be employed. The memory 304 can be integral with the processor 302, can comprise stand-alone memory, or can be a combination of both. Some examples of the memory 304 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 306 can be operatively configured to communicate with components of the adaptive cooking system 200. For example, the communication interface 306 can be configured to retrieve sensor data from the thermometer 240, weight sensor 242, identity sensor 244, infrared temperature sensor 246, and/or odor sensor 248, transmit data for storage in the memory 304, retrieve data from storage in the memory 304, and so forth. In embodiments, the communication interface 306 also includes connections to the oven components (e.g., the fan 230, the steam generator 232, and the heating element 234) or respective controllers thereof. The communication interface 306 can also be communicatively coupled with the processor 302 to facilitate data transfer between components of the adaptive cooking system 200 and the processor 302. It should be noted that while the communication interface 306 is described as a component of controller 300, one or more components of the communication interface 306 can be implemented as external components communicatively coupled to the adaptive cooking system 200 via a wired and/or wireless connection. The adaptive cooking system 200 can also include and/or connect to one or more input/output (I/O) devices (e.g., via the communication interface 306), such as a display 206, speaker, buzzer, indicator light, and/or an input device 208 (e.g., a mouse, a touchpad, a touchscreen, a keyboard, a microphone (e.g., for voice commands), or the like). In embodiments, the communication interface 306 can include or can be coupled to a transmitter, receiver, transceiver, physical connection interface, or any combination thereof.

Figure 8A:
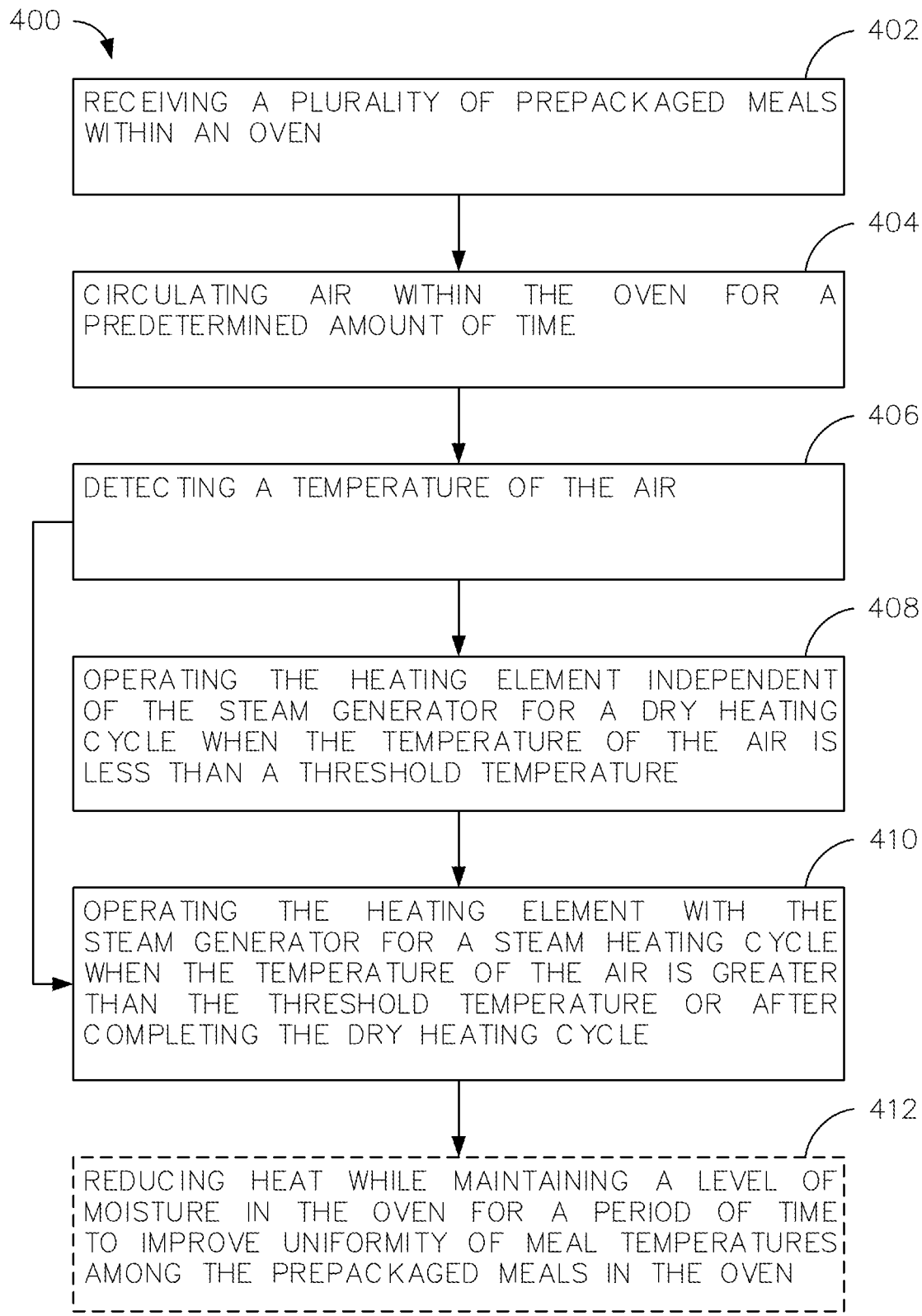
FIG. 8A is a flow diagram illustrating an example implementation of a method of adaptively cooking a plurality of prepackaged meals with an adaptive cooking system, such as the adaptive cooking system illustrated in FIGS. 1 through 7.
Figure 8B:
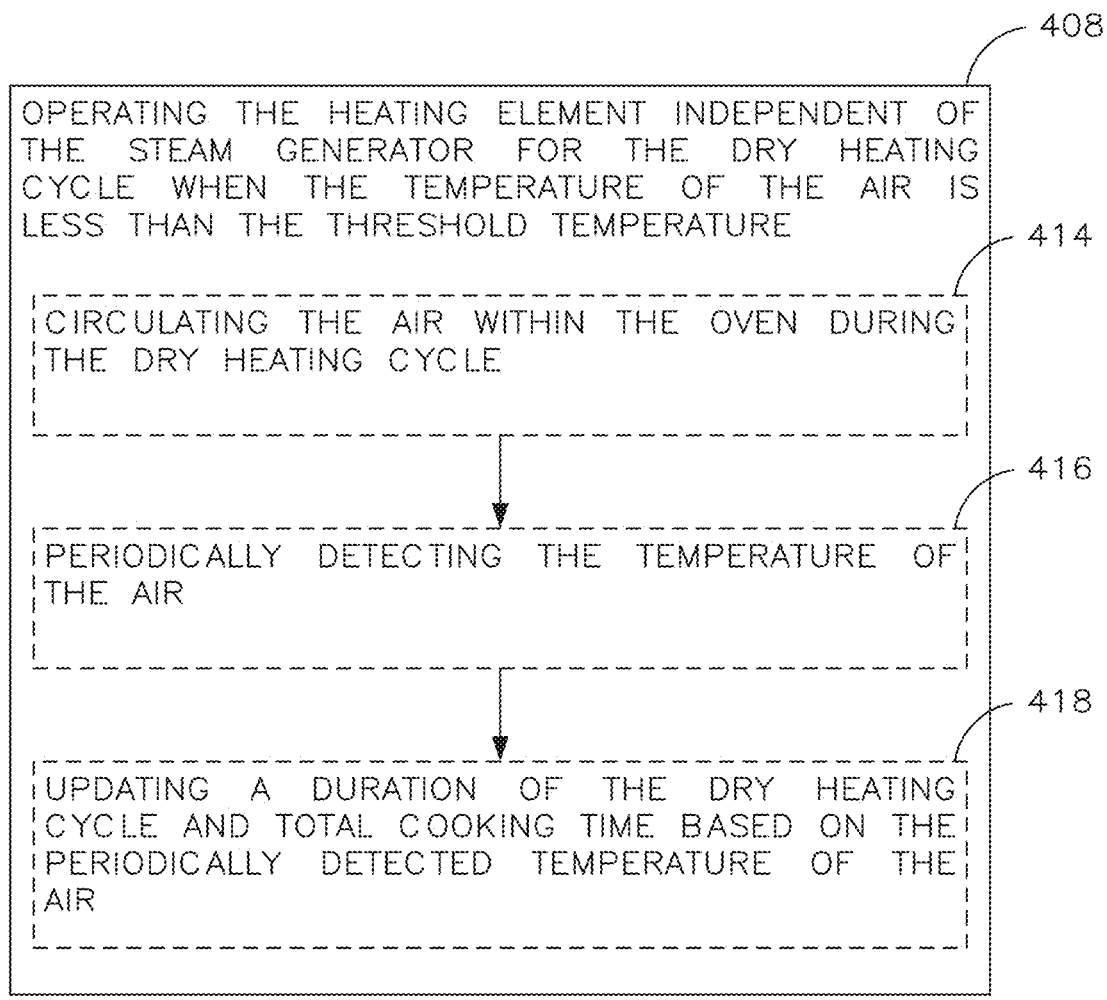
FIG. 8B is a partial flow diagram illustrating additional operations of the method illustrated in FIG. 8A, in accordance with an example implementation of the method.

FIGS. 8A and 8B illustrates an example implementation of a method 400 that employs an adaptive cooking system, such as the adaptive cooking system 200 illustrated in FIGS. 1 through 7. In general, operations of disclosed processes (e.g., method 400) may be performed in an arbitrary order, unless otherwise provided in the claims. In embodiments, the adaptive cooking system 200 is configured to execute the operations of method 400. For example, the controller 300 is configured (e.g., programmed or hard-wired) to execute the operations of method 400 that are described herein. The controller 300 and/or the oven 202 components can also be configured to perform ancillary operations (e.g., required or implied operations) to those of method 400.

Referring now to FIG. 8A, the method 400 includes receiving a plurality of prepackaged meals within an oven (block 402). In some embodiments, the oven 202 is configured to receive one or more support structures 250 (e.g., trays or racks). Each support structure 250 can be configured to carry a plurality of prepackaged meals 252. For example, the prepackaged meals 252 can include prepared raw meals, pre-cooked meals to be reheated, and/or partially cooked meals. In some embodiments, the prepackaged meals 252 may include different meal types to be cooked within the oven 202 at the same time (e.g., meat option, veggie option, pasta, chicken, beef, pork, rice, etc.).

In implementations, a user may select the meal type of the prepackaged meals 252 being placed in the oven 202. In other implementations, the oven 202 includes an identity sensor 244 configured to detect an identifier corresponding to at least one prepackaged meal of the plurality of prepackaged meals 252 disposed within the oven 202. The controller 300 can be configured to control the heating element 234 and the steam generator 232 (e.g., by adjusting a steam parameter and/or a temperature of the oven 202) at least partially based on the detected identifier. In some implementations, the oven 202 includes a plurality of identity sensors 244 and is configured to apply different heating element 234 and/or steam generator 232 parameters in proximity to different support structures 250 within the oven 202.

In some implementations, the user may select a meal quantity or fill level of the oven 202. In other implementations, the oven 202 includes a weight sensor 242 configured to detect a weight of the contents of the oven 202 cavity. For example, the weight sensor 242 may be configured to detect a weight of the support structures 250 with the plurality of prepackaged meals 252 when the support structures 250 are disposed within the oven 202. The controller 300 can be configured to control the heating element 234 and the steam generator 232 (e.g., by adjusting a steam parameter and/or a temperature of the oven 202) at least partially based on the detected weight. In some embodiments, the controller 300 may be configured to subtract a weight of the support structures 250 from the detected weight to determine a weight of the plurality of prepackaged meals 252. The controller 300 can be configured to control the heating element 234 and the steam generator 232 (e.g., by adjusting a steam parameter and/or a temperature of the oven 202) at least partially based on the weight of the plurality of prepackaged meals 252. In some embodiments, the controller 300 is further configured to divide the weight of the plurality of prepackaged meals 252 by a number of prepackaged meals to determine an average meal weight corresponding to the plurality of prepackaged meals 252. The controller 300 can be configured to control the heating element 234 and the steam generator 232 (e.g., by adjusting a steam parameter and/or a temperature of the oven 202) at least partially based on the average meal weight determined for the plurality of prepackaged meals 252.

The method 400 includes adapting a dry heating cycle and/or a steam heating cycle of the of the oven 202 based on average meal temperature of the plurality of prepackaged meals 252. For example, when the plurality of prepackaged meals 252 are frozen, the adaptive cooking system 200 can operate the oven 202 in one mode (e.g., dry heating/cooking), and when the plurality of prepackaged meals 252 are thawed, the adaptive cooking system 200 can operate the oven 202 in another mode (e.g., steam heating/cooking).

To detect an initial state (e.g., frozen or unfrozen state) of the prepackaged meals 252, air is circulated within the oven 202 for a predetermined amount of time so that the air is cooled or heated to an air temperature related to an average temperature of the plurality of prepackaged meals 252 (block 404). In embodiments, the controller 300 is configured to cause the fan 230 to circulate air within the oven 202 for a predetermined amount of time. The air temperature is then detected (block 406). For example, the controller 300 can be configured to detect a temperature of the air with the thermometer 240 after causing the fan 230 to circulate the air within the oven 202 for the predetermined amount of time. In some embodiments, rather than detecting the temperature after circulating air for a predetermined amount of time, the controller 300 monitors the temperature of the air while causing the fan 230 to circulate the air within the oven 202 and continues to do so until the air reaches a stable temperature.

The controller 300 is configured to control the heating element 234 and the steam generator 232 (e.g., by adjusting a steam parameter and/or a temperature of the oven 202) based on the air temperature. For example, the detected air temperature after the predetermined amount of time and/or after stabilizing can be compared to a threshold temperature. In some embodiments, the threshold temperature is based on a meal temperature (e.g., an average meal temperature) less than or equal to zero degrees Celsius (0° C.). When the temperature of the air is below (or less than) the threshold temperature, the heating element 234 can be operated independent of (i.e., without) the steam generator 232 for a dry heating cycle (block 408). For example, the controller 300 is configured to control the heating element and the steam generator based on the temperature of the air by operating the heating element 234 independent of the steam generator 232 for a dry heating cycle when the temperature of the air is below (or less than) the threshold temperature. When the temperature of the air is above (or greater than) the threshold temperature, or after completing the dry heating cycle, the heating element 234 can be operated with the steam generator 232 for a steam heating cycle (block 410). For example, the controller 300 is configured to control the heating element and the steam generator based on the temperature of the air by operating the heating element 234 independent of the steam generator 232 for a steam heating cycle when the temperature of the air is above (or greater than) the threshold temperature, or after completing the dry heating cycle (e.g., in cases where meals were initially frozen).

In some implementations, after the steam heating cycle (block 410), the heating element 234 is turned off or operated at lower power to reduce heat while maintaining a level of moisture in the oven 202 to improve uniformity of meal temperatures among the prepackaged meals 252 in the oven 202 (block 412). This may be referred to as a "regulated steam phase" of the cooking cycle that helps ensure all the meals 252 are about the same temperature and/or cooked equally. During this phase, the oven temperature is lowered while maintaining a moist environment. For example, the steam generator 232 may be operated independent of the heating element 234 or with the heating element 234 turned down to maintain moisture at a reduced temperature. In some implementations, the controller 300 causes the fan 230 to circulate the air within the oven 202 during the regulated steam phase in order to help distribute heat evenly among the meals 252 in the oven 202. This can help moderate the temperatures of the hottest meals and increase the temperatures of the coldest meals to reduce differences in the meal temperatures.

FIG. 8B illustrates additional operations the method 400 can include to determine the length of the dry heating cycle when applicable. During the dry heating cycle, air can continue to be circulated within the oven 202 (block 414). For example, the controller 300 can be configured to cause the fan 230 to circulate the air within the oven 202 during the dry heating cycle. The temperature of the air can be periodically detected (block 416). In some embodiments, the controller 300 is configured to periodically detect the temperature of the air with the thermometer 240 during the dry heating cycle. In other embodiments, the controller 300 is configured to continuously monitor the temperature of the air or detect the temperature at certain schedules events or triggering events. The periodically detected air temperature can be used to update the duration of the dry heating cycle and the total cooking time (block 418). For example, the controller 300 can be configured to cause the fan to update (e.g., increase or decrease) a duration of the dry heating cycle and total cooking time based on the periodically detected temperature of the air. In some embodiments, the controller 300 is configured to update the duration of the dry heating cycle and the total cooking time based on a plurality of detected temperatures over time and/or a detected change or rate of change of the temperature of the air circulating within the oven 202.

In some embodiments, the oven 202 further includes an infrared temperature sensor 246 (or a plurality of infrared temperature sensors 246) configured to detect a temperature of at least one prepackaged meal of the plurality of prepackaged meals 252 disposed within the oven 202. The controller 300 can be configured to control the heating element 234 and the steam generator 232 (e.g., by adjusting a steam parameter and/or a temperature of the oven 202) based on the detected temperature of at least one prepackaged meal. For example, the controller 300 may be configured to adjust a temperature of the heating element 234, a steam parameter, and/or a duration of a dry heating or steam heating cycle based on a temperature or a set of temperatures corresponding to one or more of the prepackaged meals 252 in the oven 202. By using direct measurements in addition to indirect (e.g., air temperature) measurements of the meal temperatures, the controller 300 may be able to better adapt the oven 202 parameters to cook or reheat the prepackaged meals 252 without overcooking or undercooking any of the foods.

In some embodiments, the oven 202 further includes an odor sensor 248 configured to detect a change in air quality within the oven 202. The controller 300 can be configured to control the heating element 234 and the steam generator 232 (e.g., by adjusting a steam parameter and/or a temperature of the oven 202) based on a detected change in air quality. For example, the controller 300 may be configured to adjust a temperature of the heating element 234, a steam parameter, and/or a duration of a dry heating or steam heating cycle based a detected change in air quality that indicates burning, overcooking, or the like. In this manner, the controller 300 may be able to better adapt the oven 202 parameters to cook or reheat the prepackaged meals 252 without overcooking or undercooking any of the foods.

In some embodiments, the oven 202 further includes a humidity sensor 254 configured to detect a moisture level of the air in the oven 202. The controller 300 can be configured to control the heating element 234 and the steam generator 232 (e.g., by adjusting a steam parameter and/or a temperature of the oven 202) based on detected moisture level. For example, the controller 300 may be configured to adjust a temperature of the heating element 234, a steam parameter, and/or a duration of a dry heating or steam heating cycle based a detected moisture level of the air in the oven 202 to keep foods from drying out or becoming too soggy.

In some embodiments, the oven 202 further includes a pressure sensor 256 configured to detect a pressure within the oven 202 cavity. The controller 300 can be configured to control the heating element 234 and the steam generator 232 (e.g., by adjusting a steam parameter and/or a temperature of the oven 202) based on detected oven pressure. For example, the controller 300 may be configured to adjust a temperature of the heating element 234, a steam parameter, and/or a duration of a dry heating or steam heating cycle based a detected moisture level of the air in the oven 202 to keep the pressure below a predetermined maximum operating pressure.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An adaptive cooking system, comprising:
an oven, the oven comprising a cavity defined by one or more inner walls and one or more surfaces, a door coupled to at least one inner wall of the one or more inner walls and positioned proximate to an exhaust vent configured to exhaust outward from a front face of a controller compartment separate from the cavity into an aircraft galley, and a latch installed within the door and configured to secure the door to the oven in a closed position during turbulence;
a heating element configured to heat the oven;
a steam generator configured to couple to a portion of the oven and configured to at least partially pass through an inner back wall of the one or more inner walls, the steam generator configured to produce steam within the oven;
a fan set within the inner back wall of the one or more inner walls and configured to circulate air within the oven, the fan being positioned behind an air circulation barrier configured to define a flow path for air circulating within the oven within the cavity, the air circulation barrier configured to couple to one or more portions of the inner back wall to create a gap between a surface of the air circulation barrier and a surface of the inner back wall, the circulated air within the oven configured to be displaced by additional air and forced back to the gap between the air circulation barrier and the inner back wall through a vent in the air circulation barrier;
a thermometer positioned in the cavity and configured to detect a temperature of air circulating within the oven, the thermometer configured to at least partially pass through the air circulation barrier; and
a controller positioned within the controller compartment separate from the cavity and behind the exhaust vent, the controller communicatively coupled to the heating element, the steam generator, the fan, and the thermometer, the controller configured to:
cause the fan to circulate air within the oven for a predetermined amount of time so that the air is cooled or heated to a temperature related to an average temperature of at least one prepackaged meal disposed within the oven;
receive a temperature of the air detected with the thermometer after causing the fan to circulate the air within the oven for the predetermined amount of time, wherein the temperature is detected prior to controlling the heating element and the steam generator; and
control the heating element and the steam generator based on the temperature of the air by:
operating the heating element during a dry heating cycle when the temperature of the air is below a threshold temperature; and
operating the heating element and the steam generator during a steam heating cycle when the temperature of the air is above the threshold temperature.

2. The adaptive cooking system of claim 1, wherein the at least one prepackaged meal is one of a plurality of prepackaged meals, wherein the controller is further configured to control the heating element and the steam generator based on the temperature of the air by:
adjusting the average temperature of the plurality of prepackaged meals during a regulated steam phase of the steam heating cycle by decreasing the power supplied to the heating element and circulating the air within the oven while maintaining a level of moisture within the oven by operating the steam generator to transfer heat from increased-temperature prepackaged meals of the plurality of prepackaged meals to decreased-temperature prepackaged meals of the plurality of prepackaged meals.

3. The adaptive cooking system of claim 1, wherein the threshold temperature is less than or equal to zero degrees Celsius (0° C.).

4. The adaptive cooking system of claim 1, wherein the controller is further configured to:
cause the fan to circulate the air within the oven during the dry heating cycle;
detect the temperature of the air with the thermometer during the dry heating cycle; and
update a duration of the dry heating cycle and a total cooking time based on the detected temperature of the air.

5. The adaptive cooking system of claim 1, further comprising:
a weight sensor configured to detect a weight associated with the at least one prepackaged meal disposed within the oven, wherein the weight is an average weight of the at least one prepackaged meal disposed within the oven, wherein the controller is communicatively coupled to the weight sensor and configured to control the heating element and the steam generator at least partially based on the detected weight.

6. The adaptive cooking system of claim 1, further comprising:
an identity sensor installed within the oven and configured to detect an identifier corresponding to the at least one prepackaged meal disposed within the oven, wherein the controller is communicatively coupled to the identity sensor and configured to control the heating element and the steam generator at least partially based on the detected identifier of the at least one prepackaged meal.

7. The adaptive cooking system of claim 1, further comprising:
an infrared temperature sensor configured to detect a temperature of the at least one prepackaged meal disposed within the oven, wherein the controller is communicatively coupled to the infrared temperature sensor and configured to control the heating element and the steam generator at least partially based on the detected temperature of the at least one prepackaged meal.

8. The adaptive cooking system of claim 1, further comprising:
an odor sensor configured to detect a change in air quality within the oven, wherein the controller is communicatively coupled to the odor sensor and configured to control the heating element and the steam generator at least partially based on the detected change in air quality within the oven.

9. An adaptive cooking system, comprising:
a support structure configured to carry a plurality of prepackaged meals;
an oven, the oven comprising a cavity defined by one or more inner walls and one or more surfaces, a door coupled to at least one inner wall of the one or more inner walls and positioned proximate to an exhaust vent configured to exhaust outward from a front face of a controller compartment separate from the cavity into an aircraft galley, and a latch installed within the door and configured to secure the door to the oven in a closed position during turbulence, the oven configured to receive the support structure within a cavity of the oven;
a heating element configured to heat the oven;
a steam generator configured to couple to a portion of the oven and configured to at least partially pass through an inner back wall of the one or more inner walls, the steam generator configured to produce steam within the oven;
a fan set within the inner back wall of the one or more inner walls and configured to circulate air within the oven, the fan being positioned behind an air circulation barrier configured to define a flow path for air circulating within the oven within the cavity, the air circulation barrier configured to couple to one or more portions of the inner back wall to create a gap between a surface of the air circulation barrier and a surface of the inner back wall, the circulated air within the oven configured to be displaced by additional air and forced back to the gap between the air circulation barrier and the inner back wall through a vent in the air circulation barrier;
a thermometer positioned in the cavity and configured to detect a temperature of air circulating within the oven, the thermometer configured to at least partially pass through the air circulation barrier; and
a controller positioned within the controller compartment separate from the cavity and behind the exhaust vent, the controller communicatively coupled to the heating element, the steam generator, the fan, and the thermometer, the controller configured to:
cause the fan to circulate air within the oven for a predetermined amount of time so that the air is cooled or heated to a temperature related to an average temperature of the plurality of prepackaged meals;
receive the temperature of the air detected with the thermometer after causing the fan to circulate the air within the oven for the predetermined amount of time, wherein the temperature is detected prior to controlling the heating element and the steam generator; and
control the heating element and the steam generator based on the temperature of the air by:
operating the heating element during a dry heating cycle when the temperature of the air is below a threshold temperature; and
operating the heating element and the steam generator during a steam heating cycle when the temperature of the air is above the threshold temperature.

10. The adaptive cooking system of claim 9, wherein the controller is configured to control the heating element and the steam generator based on the temperature of the air by:
adjusting the average temperature of the plurality of prepackaged meals during a regulated steam phase of the steam heating cycle by decreasing the power supplied to the heating element and circulating the air within the oven while maintaining a level of moisture within the oven by operating the steam generator to transfer heat from increased-temperature prepackaged meals of the plurality of prepackaged meals to decreased-temperature prepackaged meals of the plurality of prepackaged meals.

11. The adaptive cooking system of claim 9, wherein the threshold temperature is less than or equal to zero degrees Celsius (0° C.).

12. The adaptive cooking system of claim 9, wherein the controller is further configured to:
cause the fan to circulate the air within the oven during the dry heating cycle;
detect the temperature of the air with the thermometer during the dry heating cycle; and
update a duration of the dry heating cycle and a total cooking time based on the detected temperature of the air.

13. The adaptive cooking system of claim 9, further comprising:
a weight sensor configured to detect a weight of the support structure with the plurality of prepackaged meals when the support structure is disposed within the oven, wherein the controller is communicatively coupled to the weight sensor and configured to control the heating element and the steam generator at least partially based on the detected weight.

14. The adaptive cooking system of claim 13, wherein the controller is configured to control the heating element and the steam generator at least partially based on the detected weight by:
subtracting a weight of the support structure from the detected weight to determine a weight of the plurality of prepackaged meals;
dividing the weight of the plurality of prepackaged meals by a number of prepackaged meals to determine an average meal weight corresponding to the plurality of prepackaged meals; and
controlling the heating element and the steam generator at least partially based on the average meal weight determined for the plurality of prepackage meals on the support structure.

15. The adaptive cooking system of claim 9, further comprising:
an identity sensor installed within the oven and configured to detect an identifier corresponding to at least one prepackaged meal of the plurality of prepackaged meals disposed within the oven, wherein the controller is communicatively coupled to the identity sensor and configured to control the heating element and the steam generator at least partially based on the detected identifier of the at least one prepackaged meal.

16. The adaptive cooking system of claim 9, further comprising:
an infrared temperature sensor configured to detect a temperature of at least one prepackaged meal of the plurality of prepackaged meals disposed within the oven, wherein the controller is communicatively coupled to the infrared temperature sensor and configured to control the heating element and the steam generator at least partially based on the detected temperature of the at least one prepackaged meal.

17. The adaptive cooking system of claim 9, further comprising:
an odor sensor configured to detect a change in air quality within the oven, wherein the controller is communicatively coupled to the odor sensor and configured to control the heating element and the steam generator at least partially based on the detected change in air quality within the oven.

18. A method of adaptively cooking a plurality of prepackaged meals, the method comprising:
receiving a plurality of prepackaged meals within an oven, the oven comprising a cavity defined by one or more inner walls and one or more surfaces, a door coupled to at least one inner wall of the one or more inner walls and positioned proximate to an exhaust vent configured to exhaust outward from a front face of a controller compartment separate from the cavity into an aircraft galley, and a latch installed within the door and configured to secure the door to the oven in a closed position during turbulence;
circulating air with a fan set within an inner back wall of the one or more walls, the fan being positioned behind an air circulation barrier configured to define a flow path for air circulating within the oven within the cavity, the air circulation barrier configured to couple to one or more portions of the inner back wall to create a gap between a surface of the air circulation barrier and a surface of the inner back wall, the air being circulated within the oven for a predetermined amount of time so that the air is cooled or heated to a temperature related to an average temperature of the plurality of prepackaged meals, wherein the air is circulated prior to controlling the heating element and the steam generator, the circulated air within the oven configured to be displaced by additional air and forced back to the gap between the air circulation barrier and the inner back wall through a vent in the air circulation barrier;
detecting the temperature of the air with a thermometer positioned in the cavity, the thermometer configured to at least partially pass through the air circulation barrier, the temperature of the air being detected after the air has circulated within the oven for the predetermined amount of time; and
controlling a heating element and a steam generator of the oven based on the temperature of the air with a controller positioned within the controller compartment separate from the cavity and behind the exhaust vent, the controller communicatively coupled to the heating element, the steam generator, the fan, and the thermometer, the heating element and the steam generator being controlled at least in part by:
operating the heating element during a dry heating cycle when the temperature of the air is below a threshold temperature; and
operating the heating element and the steam generator during a steam heating cycle when the temperature of the air is above the threshold temperature.

19. The method of claim 18, wherein the threshold temperature is less than or equal to zero degrees Celsius (0° C.).

20. The method of claim 18, further comprising:
circulating the air within the oven during the dry heating cycle;
detecting the temperature of the air during the dry heating cycle; and
updating a duration of the dry heating cycle and a total cooking time based on the detected temperature of the air.

* * * * *